(12) United States Patent
Tojima et al.

(10) Patent No.: US 6,226,572 B1
(45) Date of Patent: May 1, 2001

(54) VEHICLE MONITOR

(75) Inventors: Masanori Tojima, Kawasaki; Masato Kageyama, Oyama; Kiyoshi Kaneko, Urawa, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/355,746

(22) PCT Filed: Feb. 12, 1998

(86) PCT No.: PCT/JP98/00561

§ 371 Date: Aug. 4, 1999

§ 102(e) Date: Aug. 4, 1999

(87) PCT Pub. No.: WO98/36337

PCT Pub. Date: Aug. 20, 1998

(30) Foreign Application Priority Data

Feb. 12, 1997 (JP) ................................................. 9-027960

(51) Int. Cl.$^7$ ........................................................... G05D 1/00
(52) U.S. Cl. ........................... 701/23; 701/50; 701/207; 701/214; 340/988; 340/991; 455/517
(58) Field of Search ............................... 701/23, 36, 50, 701/96, 207, 214; 340/988, 991, 992, 993; 455/517, 524; 342/357.01, 357.02

(56) References Cited

U.S. PATENT DOCUMENTS

| 4,009,375 | * | 2/1977 | White et al. ........................... 455/517 |
| 5,299,130 | * | 3/1994 | Ono .......................................... 701/25 |
| 5,579,339 | * | 11/1996 | McClaughry ........................... 375/220 |
| 5,666,101 | * | 9/1997 | Cazzani et al. ..................... 340/323 R |
| 5,696,706 | * | 12/1997 | Morton et al. ....................... 702/142 |
| 5,731,788 | * | 3/1998 | Reeds .................................... 342/357 |
| 5,787,359 | * | 7/1998 | Nagata ................................... 455/517 |

FOREIGN PATENT DOCUMENTS

| 63-150709 | 6/1988 | (JP) . |
| 63-150710 | 6/1988 | (JP) . |

* cited by examiner

Primary Examiner—William A. Cuchlinski, Jr.
Assistant Examiner—Gertrude Arthur
(74) Attorney, Agent, or Firm—Varndell & Varndell, PLLC

(57) ABSTRACT

In accordance with the equipment of the present invention, the communication over the entire region of a wide working site can be performed without a cost increase due to the installation of auxiliary equipment, the mutual control of vehicles can be performed with a light burden on a monitoring station without sacrificing safety, and when a failure occurs to transmission/reception equipment, the failure can be quickly and accurately confirmed, and accordingly the abnormality can be quickly and properly dealt with. In the of the present invention, first transmission/reception system for transmitting/receiving at least command data between the monitoring station and a plurality of vehicles via a first communication system which enables wireless communication over the distances between the monitoring station and the vehicles is provided in the monitoring station and the vehicles respectively. Second transmission/reception system for transmitting/receiving position data measured by vehicle position measurement between the vehicles via a second communication system which enables wireless communication over the distances between the vehicles and enables faster data transmission/reception than the first communication system is provided in the vehicles respectively. The respective vehicles judge the approach of another vehicle by transmitting position data between the vehicles via the second transmission/reception system provided in the vehicles respectively, so that the mutual position relationships between the vehicles can be monitored.

13 Claims, 8 Drawing Sheets

VEHICLE MONITOR

TECHNICAL FIELD

The present invention relates to a vehicle monitor comprising a plurality of vehicles having vehicle position measurement means for measuring the respective vehicle position and a monitor station which transmits command data for instructing traveling to the plurality of vehicles.

BACKGROUND ART

In order to manage the movement of a plurality of unmanned vehicles, unmanned dump trucks for example, for transporting soil in a wide working site, such as a quarry and mine, a monitoring station is established as a ground station and a vehicle monitoring system is structured such that this monitoring station manages and monitors these unmanned vehicles comprehensively.

This vehicle monitoring system has a transmission/reception equipment (e.g. VHF system) for performing long distance wireless communication between the monitoring station and the plurality of vehicles, and various data, including the position data of the respective vehicles which were measured, is transmitted to the monitoring station in extremely short cycles (e.g. every one second), so that the monitoring station can monitor each vehicle knowing the accurate position of the respective vehicles.

The monitoring station which received the position data from a vehicle transmits data to notify reception so that each vehicle can confirm the occurrence of failure of its transmission/reception equipment.

Recently, however, it is becoming necessary to monitor many vehicles (50–100 vehicles) which travel very long distances (approx. 10 km) in many traveling courses, where information to be handled is dramatically increasing.

To handle this status, it is necessary to install transmission/reception equipment which can perform fast wireless communication in a wide range (long distance).

According to currently available technology, the following are the two types of communication systems which can practically support such monitoring of vehicles.

1) VHF, UHF
2) SS (spread spectrum system) wireless communication

However, if the 1) VHF or UHF system is applied to the above mentioned vehicle monitoring system, the communication system, which allows long distance communication (10 km–20 km), can provide communication in the whole region of a wide working site, but the current positions of many vehicles cannot be constantly known since the communication speed is slow (9600 bps). In other words, a large volume of data is transmitted from many vehicles to the monitoring station. And since the communication system with a slow communication speed handles this large volume of communication information, communication lines jam, the load on the communication lines increases, and the management and monitoring of the vehicles become virtually impossible.

If the 2) SS wireless communication system is applied to the vehicle monitoring system, the communication system which allows high-speed communication (256 Kbps) can transmit an extremely large volume of information at high-speed, but cannot provide communication in the whole region of a wide working site, which is now becoming increasingly wider, since the propagation distance of radio waves is short (100 m–1 Km).

Also, in order to provide communication in the whole region of a wide working site by SS wireless communication, such auxiliary equipment as radio stations must be installed at various locations of the working site to compensate for the insufficient propagation distance of radio waves. This increases cost for initial investment and maintenance, which lessens the practicality of this system.

Conventionally the communication system in the above 1) has been adopted, and in order to compensate for the management of vehicles performed by the monitoring station, an obstacle sensor is installed on each vehicle, so that this sensor confirms the presence of other vehicles to prevent collision. However such a system which prevents collision by such a sensor alone has safety problems, and is not desirable. This is because 100% collision cannot be prevented when many vehicles pass cross sections or pass another vehicle.

In both the communication systems of the above 1) and 2), the monitoring station controls all vehicles, therefore the problem of excessive load on the monitoring station remains unsolved.

Further, when many vehicles transmit data to the monitoring station, the monitoring station transmits data for notifying the reception of the data back to the many vehicles so that each vehicle confirms the failure of the transmission/reception equipment of the respective vehicle, as mentioned above, but if this method is implemented by the communication method in the above 1), the monitoring station cannot always transmit the data for notifying the reception of the data back to many vehicles due to the slow communication speed of the system, and as a result, the vehicles cannot quickly and accurately confirm the failure of the respective vehicles.

In this way, the number of vehicles which a conventional monitoring system can manage is limited because of the shortcomings of the communication system, even though it is necessary to exchange a large volume of data.

With the foregoing in view, it is an object of the present invention to provide means to perform communication over the whole region of a wide working site without increasing cost due to the installation of auxiliary equipment, and to sufficiently perform mutual control of vehicles with a light burden on a monitoring station without sacrificing safety, and to quickly and accurately confirm failures which occur to transmission/reception equipment, so that an abnormality can be dealt with quickly and properly.

DISCLOSURE OF THE INVENTION

A first aspect of the present invention is a vehicle monitor comprising a plurality of vehicles each having vehicle position measurement means for measuring an own vehicle position and a monitoring station which transmits command data to instruct traveling to the plurality of vehicles, characterized in that first transmission/reception means for transmitting/receiving at least the above command data between the monitoring station and the plurality of vehicles via a first communication system which enables wireless communication over distances between the monitoring station and the plurality of vehicles is provided in the monitoring station and the plurality of vehicles respectively, second transmission/reception means for transmitting/receiving position data measured by the above vehicle position measurement means between the plurality of vehicles via a second communication system which enables wireless communication over distances between the plurality of vehicles and enables faster data transmission/reception than the first communication system is provided in the plurality of vehicles respectively, and the respective vehicles judge the approach of other vehicles by transmitting the above position data between the plurality of vehicles via the second transmission/reception means provided in the plurality of vehicles respectively, so that mutual position relationships between the plurality of vehicles are monitored.

According to the first aspect, the first communication/transmission means (e.g. VHF, UHF system), enables communication over long distances between the monitoring station and the plurality of vehicles without increasing cost due to the installation of auxiliary equipment. The monitoring station merely transmits at least the command data via the first transmission/reception means, and the position data is transmitted/received between the plurality of vehicles via the second transmission/reception means (e.g. SS wireless communication system) to monitor the mutual position relationships between the plurality of vehicles, therefore the frequency of communication between the monitoring station and the plurality of vehicles can be decreased, load on the monitoring station and load on the communication lines can be decreased, and collision prevention control can be performed by high-speed communication among the vehicles, which assures safety.

Also two types of transmission/reception means transmit data to the vehicles, so even if such an abnormality as a fault occurs in one transmission/reception means, this information on the abnormality can be immediately and accurately notified to the vehicles by the other transmission/reception means so that predetermined abnormality processing, stopping vehicles for example, is immediately and properly executed.

A second aspect of the present invention is a vehicle monitor comprising a plurality of vehicles each having vehicle position measurement means for measuring an own vehicle position and a monitoring station which receives position data transmitted from the respective vehicles, and transmits command data to instruct traveling to the plurality of vehicles while monitoring the mutual position relationships of the plurality of vehicles based on the received position data, characterized in that first transmission/reception means for transmitting/receiving the above position data and the above command data between the monitoring station and the plurality of vehicles via a first communication system, which enables wireless communication over distances between the monitoring station and the plurality of vehicles is provided in the monitoring station and the plurality of vehicles respectively, second transmission/reception means for transmitting/receiving the above position data between the plurality of vehicles via a second communication system, which enables wireless communication over the distances between the plurality of vehicles and enables faster data transmission/reception than the first communication system, is provided in the plurality of vehicles respectively, the above position data is transmitted to the monitoring station each time the predetermined time elapses via the first transmission/reception means provided in the plurality of vehicles respectively, so that the monitoring station monitors the positions of the plurality of vehicles, and the respective vehicles judge the approach of other vehicles by transmitting the above position data between the plurality of vehicles via the second transmission/reception means provided in the plurality of vehicles respectively, so that the mutual position relationships between the plurality of vehicles are monitored.

The second aspect of the invention has the following functions and effects in addition to the functions and effects of the first aspect of the invention.

The position data is transmitted to the monitoring station each time the predetermined time elapses via the first transmission/reception means provided in the plurality of vehicles respectively so that the monitoring station can monitor the positions of the plurality of vehicles, therefore the monitoring station can know the general position relationships between the vehicles with a light load on the communication lines, and can accurately transmit appropriate commands to each vehicle.

Also the position data is transmitted between the plurality of vehicles via the second transmission/reception means provided in the plurality of vehicles respectively so that the respective vehicles judge the approach of other vehicles, therefore each vehicle can immediately and accurately know the mutual position relationships between the vehicles, which enables quick and accurate control to prevent collision between the vehicles when the vehicles are traveling a cross section or are passing each other.

BEST MODE FOR CARRYING OUT THE INVENTION

Embodiments of the vehicle monitor in accordance with the present invention will now be described with reference to the accompanying drawings.

Figure 1:
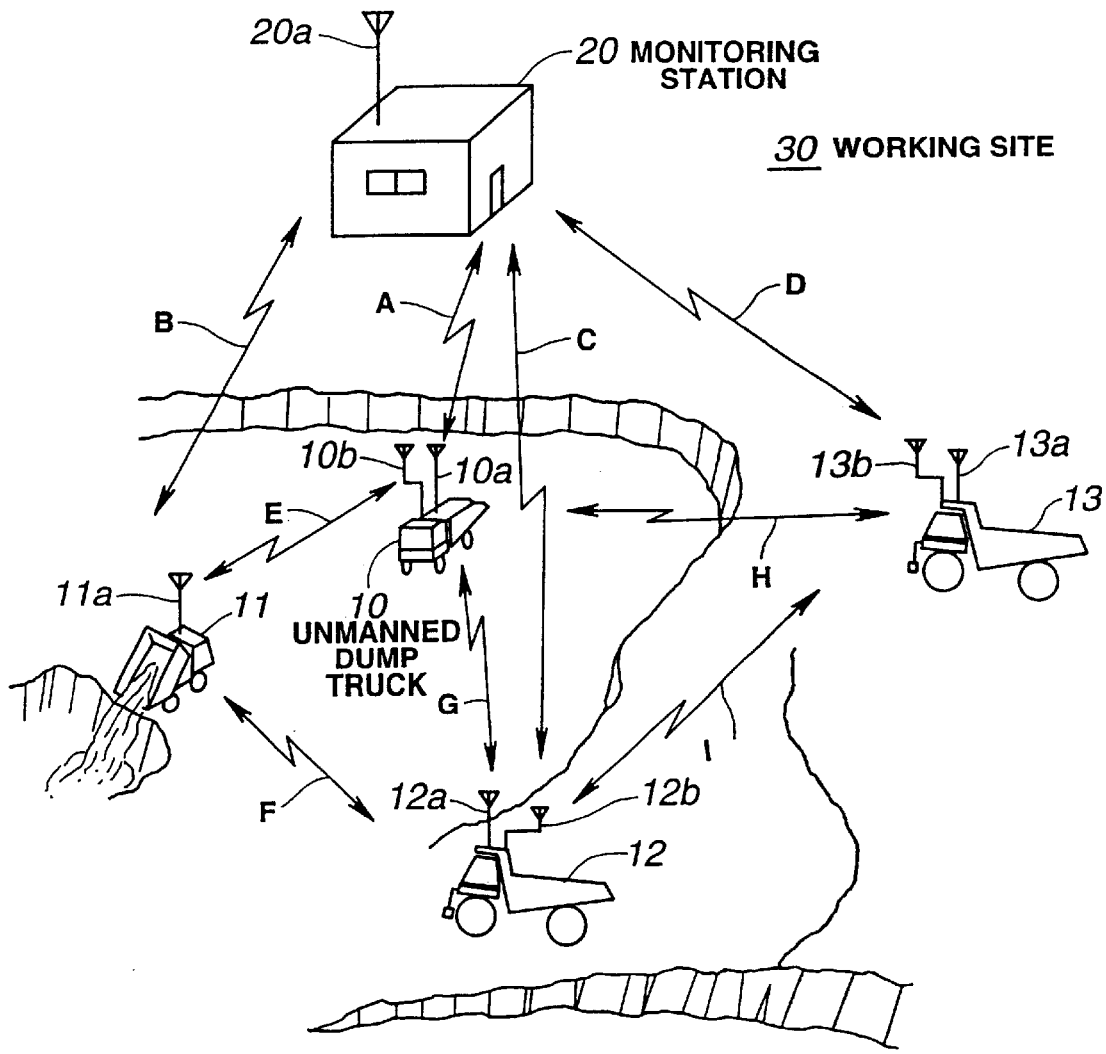
FIG. 1 is an external view of an unmanned dump truck monitoring system, which is an embodiment of the vehicle monitoring system in accordance with the present invention.

FIG. 1 is an external view of an unmanned dump truck monitoring system which manages and monitors many unmanned dump trucks 10, 11, 12, 13, . . . in a wide working site 30, such as a mine, which is assumed in this embodiment.

Figure 2:
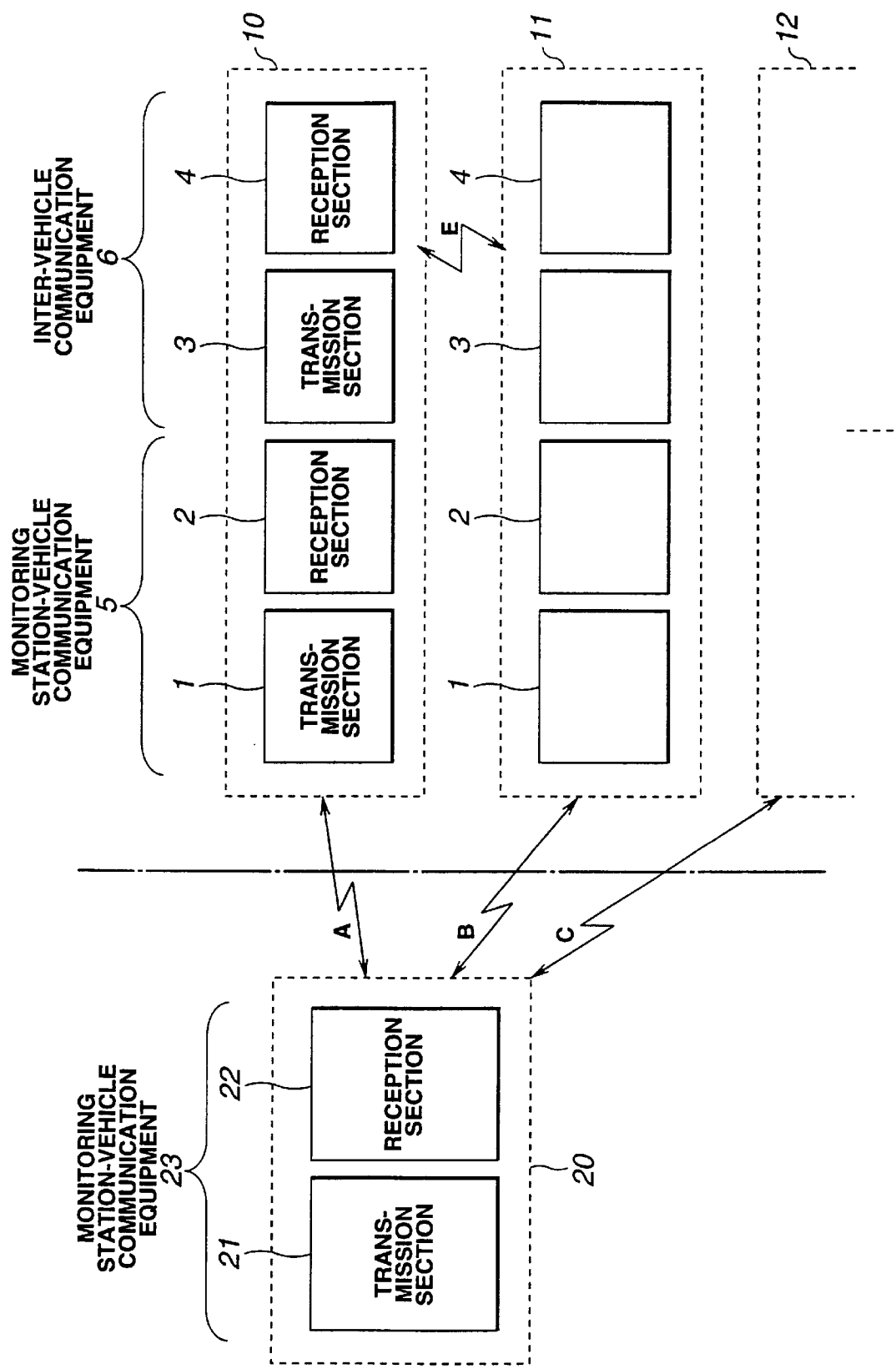
FIG. 2 is a block diagram depicting the configuration of a communication system of the embodiment.

FIG. 2 is a block diagram depicting the wireless communication system of this unmanned dump truck monitoring system.

As FIG. 1 shows, this unmanned dump truck monitoring system comprises a plurality of unmanned dump trucks (hereafter vehicles) 10, 11, 12, 13, . . . having a later mentioned vehicle position measurement equipment for measuring respective vehicle position (X, Y), and a monitoring station 20 which receives the position data (X, Y) transmitted from the plurality of vehicles 10 . . . respectively, monitors the mutual position relationship of the plurality of vehicles 10 . . . , and transmits command data for instructing traveling and stopping to the plurality of vehicles 10 . . . based on the received position data.

In this embodiment, unmanned dump trucks are assumed as the vehicles, but the present embodiment may be applied to manned vehicles or such vehicles other than dump trucks as wheel loaders and hydraulic excavators, or a system where the unmanned vehicles and manned vehicles coexist, or a system where dump trucks, wheel loaders, hydraulic excavators and other vehicles coexist.

As FIG. 2 shows, wireless communication is performed between the monitoring station 20 and the plurality of vehicles 10 . . . via monitoring station-vehicle communication equipment 23 and 5.

In the distances between the monitoring station 20 and the plurality of vehicles 10 . . . , that is, in the whole region of the wide working site 30, communication systems which enable wireless communication, such as the monitoring station-vehicle communication equipment 23 and 5 based on the VHF system, are disposed in the monitoring station 20 and the vehicles 10 . . . respectively, and the above mentioned position data and the command data are transmitted/received between the monitoring station 20 and the plurality of vehicles 10 . . . .

The monitoring station-vehicle communication equipment 23 at the monitoring station 20 side comprises a transmission section 21 and a reception section 22, and the monitoring station-vehicle communication equipment 5 at the vehicle 10 side comprises a transmission section 1 and a reception section 2, where wireless communication A is performed via an antenna 20a of the monitoring station 20 and an antenna 10a of the vehicle 10, as shown in FIG. 1. For the other vehicles as well, wireless communication B is performed via the antenna 20a of the monitoring station 20 and an antenna 11a of the vehicle 11, wireless communication C is performed via the antenna 20a of the monitoring station 20, and an antenna 12a of the vehicle 12, and wireless communication D is performed via the antenna 20a of the monitoring station 20 and an antenna 13a of the vehicle 13 respectively in the same manner.

Between the plurality of vehicles as well, wireless communication is performed by the inter-vehicle communication equipment 6.

In other words, the inter-vehicle communication equipment 6, which enables wireless communication over the distances between the plurality of vehicles and enables faster data transmission/reception than the above monitoring station-vehicle communication equipment 23 and 5, is disposed in each vehicle 10, 11, 12, 13, . . . , and the above position data is transmitted/received between the plurality of vehicles.

The inter-vehicle communication equipment 6 of the vehicles 10 . . . comprises a transmission section 3 and a reception section 4, and as FIG. 1 shows, wireless communication E is performed via the antenna 10b of the vehicle 10 and the antenna 11b of the vehicle 11, wireless communication F via the antenna 11b of the vehicle 11 and the antenna 12b of the vehicle 12, wireless communication G via the antenna 10b of the vehicle 10 and the antenna 12b of the vehicle 12, wireless communication H via the antenna 10b of the vehicle 10 and the antenna 13b of the vehicle 13, and wireless communication I via the antenna 12b of the vehicle 12 and the antenna 13b of the vehicle 13 respectively. Wireless communication may be impossible between vehicles where the distance is greater than radio wave propagation distance (e.g. between vehicles 11 and 13).

A tire rotation sensor 30 (e.g. dial pulse encoder), which is a vehicle traveling distance detection part, is disposed on the tires of each vehicle 10 . . . to detect rotation frequency N of tires. A gyro 31 (e.g. optical fiber tyro), which is a vehicle orientation detection section, is disposed on the body of each vehicle to detect angular speed w of the posture angle of the vehicles.

The vehicle position (X, Y) (a position on 2-dimensional coordinate system X-Y) is detected based on each output of the above tire rotation sensor 30 and the gyro 31, as described later, but since this vehicle position includes accumulated errors due to tire slippage and other factors, accumulated errors may be intermittently corrected by the relative position relationships between the vehicle and reflection poles, for example, which are disposed intermittently along the predetermined traveling path of the vehicle.

The vehicle position may be measured by a GPS (Global Positioning System).

An arithmetic processing unit 32 comprised of a CPU, memory and other components is equipped on each vehicle 10 . . . so that processing based on later mentioned dead reckoning is performed, and control signals are output to e.g. each electromagnetic proportional control valve for driving the vehicle.

The processing content to be executed by the arithmetic processing unit 32 will now be explained.

When a detection signal of the tire rotation sensor 30, which is a vehicle traveling distance detection part, and a detection signal of the gyro 31, which is a vehicle orientation detection part, are input to the arithmetic processing unit 32, the following processing is sequentially executed.

Operating vehicle traveling distance S

The tire rotation frequency N is determined based on the detection signal by the tire rotation sensor 30.

Then the vehicle traveling distance S is calculated by the product of the tire rotation frequency N and a known tire load radius r.

Operation of vehicle orientation θ

The change of vehicle orientation ΔO is calculated by integrating the angular speed ω posture angle of the vehicle based on the detection signal provided by the gyro 31, and the current vehicle orientation e from the initial vehicle orientation is calculated by adding the change of orientation Δθ to the known initial orientation.

Operation of vehicle position (X, Y)

The vehicle coordinate position (X, Y) on an X-Y coordinate is determined by integrating the product of the above vehicle traveling distance S and sine sin and cosine cos of the vehicle orientation θ, which is S·sin θ, S·cos θ.

Figure 8:
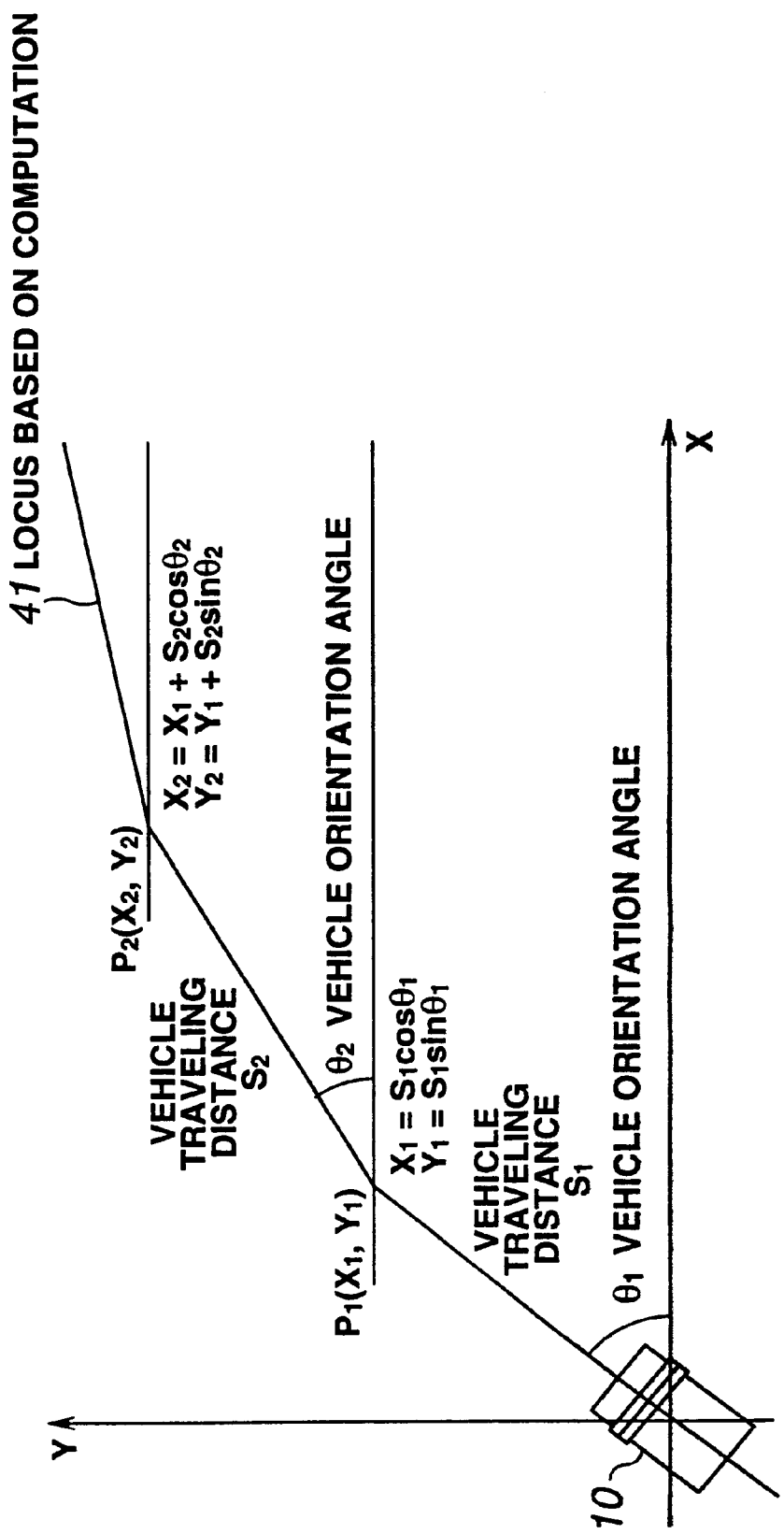
FIG. 8 is a drawing for explaining dead reckoning.

In other words, as FIG. 8 shows, sequential vehicle positions P1 (X1, Y1)=(S1·cos θ1, S1·sin θ1), P2 (X2, Y2)=(X1+S2·cos θ2, Y1+S2·sin θ2), . . . are calculated and locus 41 of each vehicle, vehicle 10 for example, is determined.

The arithmetic processing unit 32 compares the locus 41 of the vehicle 10 which is computed as above, and the predetermined traveling path 40, which is a target route, and controls the vehicle 10 based on dead reckoning so that the vehicle 10 traces the predetermined traveling path. In other words, the arithmetic processing unit 32 outputs predetermined electric signals to the steering hydraulic electromagnetic proportional control valve and controls the steering angle of the steering so that the sequential target vehicle positions P'1, P'2, P'3 . . . and the target vehicle orientations θ'1, θ'2, θ'3 . . . on the predetermined traveling path 40 are obtained. The arithmetic processing unit 32 also outputs predetermined electric signals to an electronic control governor, a transmission solenoid valve, and a brake pressure electromagnetic proportional control valve so that the sequential target vehicle positions and target vehicle orientations on the predetermined traveling path 40 are obtained, and controls the rotational frequency of the engine, speed steps of transmission and brake pressure. In this way, the vehicle 10 is guided so as to travel along the predetermined traveling path 40.

In this embodiment, many traveling paths 40-1, 40-2, 40-3 . . . are assumed as the predetermined traveling path 40, since the plurality of vehicles 10 basically have different paths respectively. These traveling paths 40-1, 40-2, 40-3 . . . may have cross points, and the vehicles may pass each other on the same traveling path.

Therefore, the teaching of such predetermined traveling path 40 is executed before actual operation.

Teaching traveling on predetermined traveling path 40

An operator actually operates one vehicle, vehicle 10 for example, allowing it to travel along all the predetermined traveling paths 40-1, 40-2, 40-3 . . . to obtain the position data (X, Y) and orientation data θ' of each point P'1, P'2, P'3 . . . on the predetermined traveling paths, data on speed when passing each point, and other data (hereafter traveling path data), and the traveling path data is transmitted to the monitoring station 20 by the above mentioned monitoring station-vehicle communication equipment 5.

The monitoring station 20, which received this traveling path data, transmits the traveling path data on the predetermined traveling paths required for each vehicle 10, 11, 12, 13 . . . to each vehicle by the monitoring station-vehicle communication equipment 23. If the predetermined traveling path of the vehicle 10 is the traveling path 40-1, for example, the traveling path data on the traveling path 40-1 is transmitted to the vehicle 10. All traveling path data may be transmitted to each vehicle.

Figure 3:
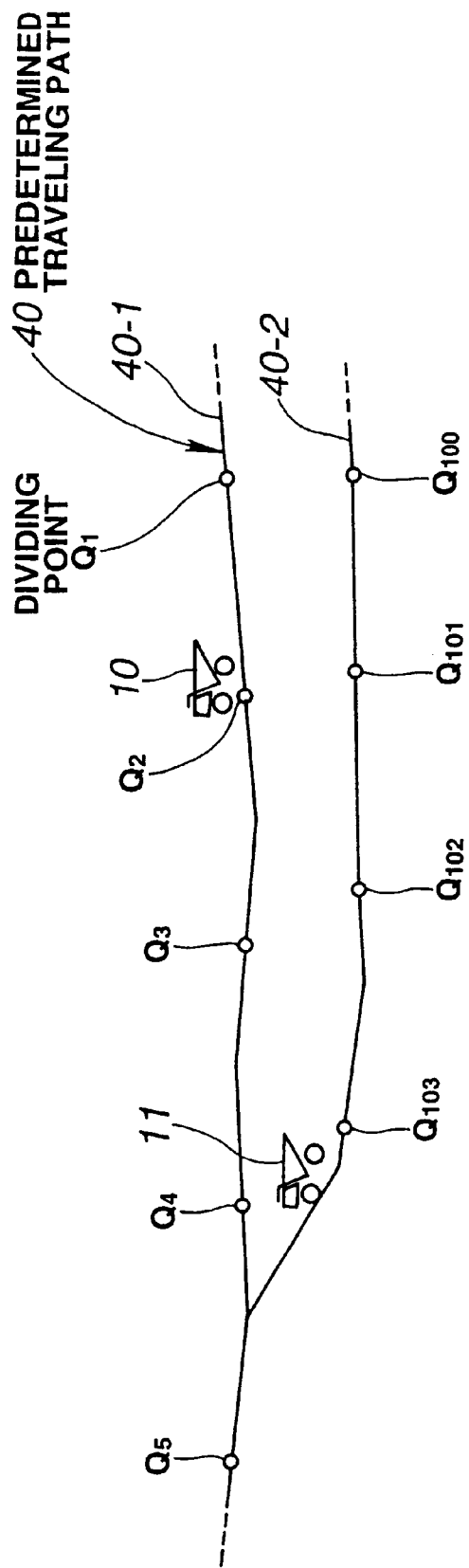
FIG. 3 is a drawing depicting the state where the predetermined traveling path of an unmanned dump truck is divided into individual points in accordance with the embodiment.

During this teaching, the dividing position data (X, Y) of each dividing point Q1, Q2, Q3 . . . , when the predetermined traveling path 40 is divided into a plurality of points, is obtained separately from the target points for dead reckoning (see FIG. 3).

Each time a respective vehicle passes each one of these dividing points Q1, Q2, Q3, the respective vehicle is supposed to transmit the current position data P (X, Y) of the respective vehicle to the monitoring station 20 via the monitoring station-vehicle communication equipment 5. Therefore the following is considered when these dividing points Q1, Q2, Q3 . . . are defined.

1) Considering the number of vehicles and the communication speed of the communication system (e.g. VHF) of the monitoring station-vehicle communication equipment 23 and 5, an interval (time) is set such that a heavy load is not applied to the communication line and the monitoring station 20 can constantly know the position of each vehicle.

The following can also be considered.

2) Considering the weight and speed of the vehicle, the dividing points are set such that the distance between adjacent dividing points (Qi–Qi+1) is not shorter than the stopping distance of the vehicle.

3) The dividing points are set such that when an obstacle sensor is disposed on the vehicle, the distance between the adjacent dividing points (Qi–Qi+1) is not shorter than the effective detection distance of the obstacle sensor.

The dividing point data obtained in this way is transmitted to the monitoring station 20 along with the above traveling path data via the monitoring station-vehicle communication equipment. 5.

The monitoring station 20 receives this dividing point data and transmits the dividing point data on the predetermined traveling paths required for the vehicle 10, 11, 12, 13 . . . to these vehicles respectively via the monitoring station-vehicle communication equipment 23. For example, if the predetermined traveling path of the vehicle 10 is the traveling path 40-1, then the dividing point data on the traveling path 40-1 is transmitted to the vehicle 10. The dividing point data on all the traveling paths may be transmitted to each vehicle.

Teaching ends in this way and teaching data (traveling path data, dividing point data) is stored in the predetermined memory of each vehicle.

In the above embodiment, dividing points are defined as points where each vehicle transmits current position data P (X, Y) of that respective vehicle to the monitoring station 20, but the interval of the transmission time, equivalent to the distance between the dividing points, may be preset. To determine the interval of the transmission time as well, the above 1), 2) and 3) (at least 1)) are considered.

Starting traveling of each vehicle (playback operation)

When the above mentioned teaching ends, the monitoring station 20 transmits the command data indicating the final target position (destination) to each vehicle 10 . . . via the transmission section 21 of the monitoring station-vehicle communication equipment 23. If position measurement is performed by GPS, the monitoring station 20 transmits the differential data of GPS to the respective vehicles.

When the reception section 2 of the monitoring station-vehicle communication equipment 5 of each vehicle receives the above data, the arithmetic processing unit 32 guides the respective vehicle along the predetermined traveling path 40 by the above mentioned dead reckoning based on the teaching traveling path data stored in the memory, and executes a series of operations such as loading, transporting and unloading.

Controlling and monitoring by the monitoring station

During the above time, each vehicle 10 . . . constantly compares its current position measuring data (X, Y) and the teaching data on dividing points stored in its memory, and constantly judges whether the respective vehicle has reached each dividing point Q1, Q2 and Q3. When the vehicle reaches a dividing point, the transmission part 1 of the monitoring station-vehicle communication equipment 5 transmits the current position data (X, Y) to the monitoring station 20.

When the reception section 22 of the monitoring station-vehicle communication equipment 23 of the monitoring station 20 receives the position data which was transmitted by the respective vehicles 10 . . . , the arithmetic processing unit 24 of the monitoring station 20 judges that the plurality of vehicles 10 . . . approached at least a distance between the dividing points Qi–Qi+1 (hereafter segment).

In this way, the monitoring station 20 can constantly know the general mutual position relationships between the plurality of vehicles without applying load on the communication lines, and as a result, when vehicles are about to collide with each other at a cross section or when a vehicle is about to bump into another vehicle, appropriate command data for traveling and stopping can be transmitted to the vehicles via the transmission section 21 of the monitoring station-vehicle communication equipment 23.

In the situation shown in FIG. 3, for example, the vehicle 10 is traveling a segment between the dividing points Q2-Q3, and the vehicle 11 is traveling a segment between the dividing points Q103-Q5, where the vehicles have a sufficient distance in between and do not collide at the cross section, therefore the vehicles can continuously travel, but if the vehicle 10 is traveling the dividing points Q3-Q4, the distance between the vehicles is not sufficient and a collision may occur at the cross section, therefore the command data for decreasing speed or for stopping is transmitted to the vehicle 10.

In the above mentioned embodiment, each vehicle 10 . . . transmits the current position data to the monitoring station 20, but the orientation data θ, speed data, data indicting the reliability (error) of position measurement, and data indicating the deviation of the vehicle from the predetermined traveling path 40, and other data, may also be transmitted to the monitoring station 20 so as to improve the accuracy of control and monitoring of the monitoring station 20.

Control and monitoring between vehicles

When the respective vehicles 10 . . . are traveling (operating), the position data is transmitted/received between the vehicles via the inter-vehicle communication equipment 6 disposed in the respective vehicles.

Since communication lines may Jam if all the vehicles transmit/receive at the same time, priority can be determined as follows.

1) Respective vehicles constantly transmit the position data of the respective vehicles via the inter-vehicle communication equipment 6, by which respective vehicles confirm the presence of the vehicles traveling within the closest distance. Hereafter, the vehicles closest to each other frequently transmit/receive the position data via the inter-vehicle communication equipment 6 with priority.

2) The monitoring station 20 confirms the presence of vehicles closest to each other based on the position data transmitted from the respective vehicles. The monitoring station 20 transmits this information to those vehicles closest to each other via the monitoring station-vehicle communication equipment 23 and 5. Hereafter, the vehicles closest to each other, to which this information was transmitted, frequently transmit/receive the position data via the inter-vehicle communication equipment 6 with priority.

The vehicles which are assigned priority in inter-vehicle communication perform control so as to prevent the mutual interference of the vehicles based on the received position data of the other vehicle.

In other words, when the vehicles are about to collide at a cross section or when one vehicle is about to bump into another vehicle, it is decided which vehicle will decrease speed and which vehicle will advance.

Although the monitoring station 20 can only judge that the respective vehicles 10 . . . have approached a distance between dividing points Qi–Qi+1 (hereafter segment), as described above (can judge that different vehicles are traveling the same segment), the inter-vehicle communication equipment 6 allows the respective vehicles to accurately judge that another vehicle has approached a shorter distance than the above segment distance.

As a result, control when vehicles closely approach each other, a situation where the monitoring station 20 cannot instruct, is possible to prevent interference when vehicles pass each other. When the vehicles 10 and 11 in FIG. 3 are traveling towards each other in the same segment Q2-Q3, for example, both of the vehicles 10 and 11 know the accurate positions in the segment Q2-Q3, so it is possible to accurately avoid each other by traveling at a minimum decrease in speed when they pass each other.

In the above embodiment, the respective vehicles 10 . . . transmit/receive their current positions to each other via the inter-vehicle communication equipment 6, but orientation data θ, speed data, data indicating reliability (error) of position measurement, data indicating deviation of a vehicle from the predetermined traveling path 40, data indicating the weight of the vehicle, and data indicating the distance to a cross section may be transmitted/received as well so as to improve the accuracy of priority when entering a cross section and accuracy to prevent a collision. Also in addition to the position data, orientation data θ, speed data, data indicating reliability (error) of position measurement, data indicating deviation of the vehicle from the predetermined traveling path 40, and data indicating the weight of the vehicle, data indicating the effective detection distance of the obstacle detection sensor may be transmitted/received so as to improve the accuracy of speed to be decreased when vehicles pass each other by and to improve the accuracy to prevent a collision.

Handling at communication equipment failure

In this embodiment, data can be transmitted to vehicles by the two communication equipment, therefore, even if an abnormality, such as a failure, occurs to one communication equipment, the information on the occurrence of an abnormality can be immediately and accurately notified to the vehicles via the other communication equipment, so as to immediately and properly execute predetermined abnormality processing, such as stopping vehicles.

Figure 4:
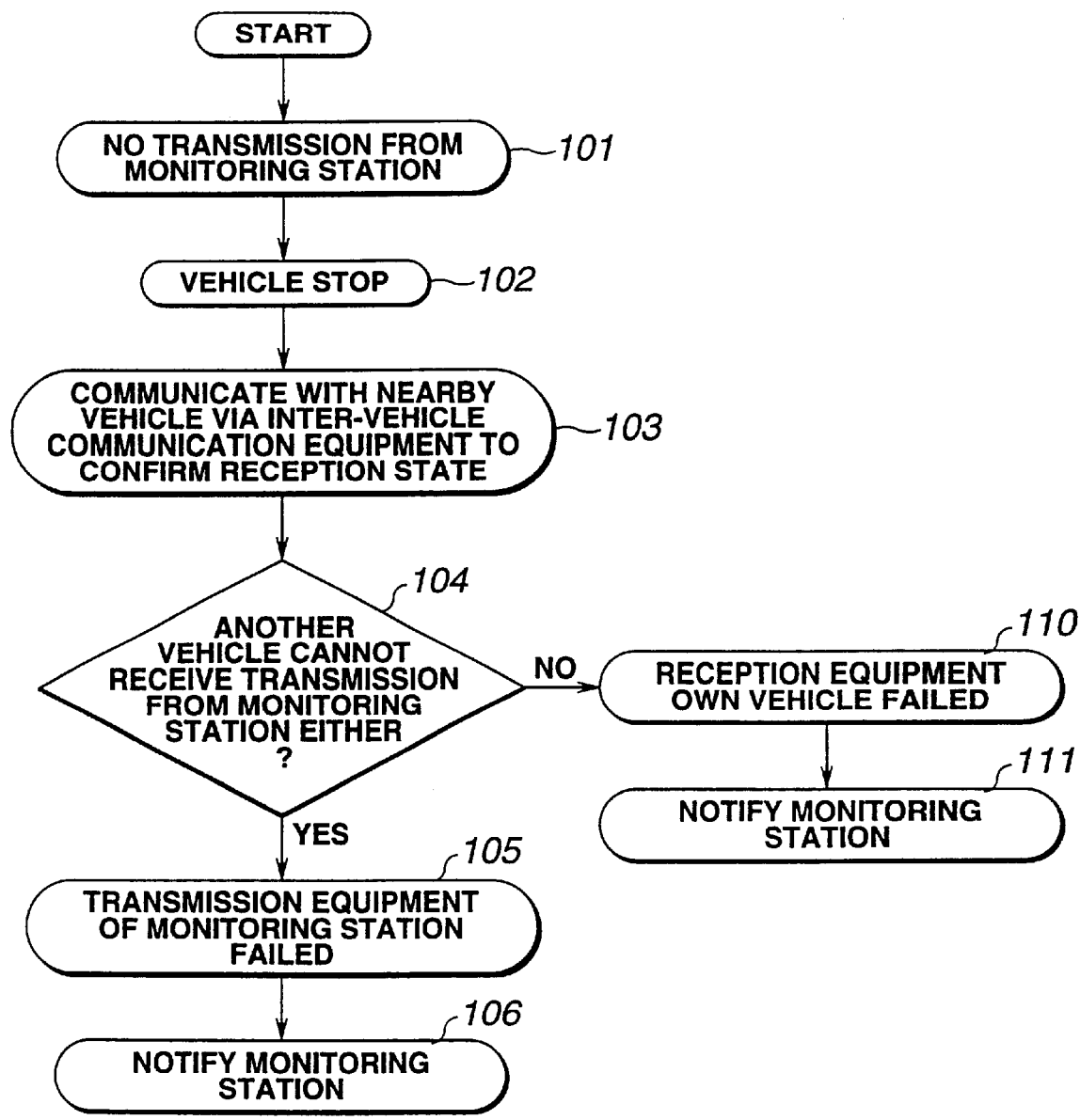
FIG. 4 is a flow chart indicating failure judgment and abnormality processing procedures in accordance with the present embodiment.

FIG. 4 is a flow chart indicating the failure judgment and abnormality processing procedures when the monitoring station 20 cannot transmit data to the vehicles.

The monitoring station 20 transmits predetermined data, data indicating the mutual position relationships of all the vehicles for example, to the respective vehicles 10 . . . via the transmission section 21 of the monitoring station-vehicle communication equipment 23 at a predetermined cycle. The respective vehicles 10. . . , on the other hand, judge whether the reception part 2 of the monitoring station-vehicle communication equipment 5 of the respective vehicle received the above predetermined data each time the above predetermined cycle elapses. And if the vehicle 10, for example, judges that the above predetermined data, which was supposed to have been transmitted from the monitoring station 20, has not been received (Step 101), then the vehicle 10 judges that a failure occurred either to the transmission section 21 of the monitoring station-vehicle communication equipment 23 of the monitoring station 20 or to the reception section 2 of the monitoring station-vehicle communication equipment 5 of the vehicle 10, and the vehicle 10 stops to insure safety judging that sufficient information to prevent a collision of vehicles cannot be obtained in this state (Step 102).

The stopped vehicle 10 executes transmission/reception with the other vehicles 11, 12 . . . which are nearby via the inter-vehicle communication equipment 6 which is functioning normally, so as to confirm the reception state of the other vehicles with the monitoring station 20 (Step 103).

The other vehicles 11, 12 . . . judge whether the above predetermined data has been received via the reception section 2 of own monitoring station-vehicle communication equipment 5 each time the above predetermined cycle elapses (Step 104), and if the other vehicles Judge that the above predetermined data, which was supposed to have been transmitted from the monitoring station 20, has not been received as well, then the vehicle 10 judges that a failure occurred to the transmission section 21 of the monitoring station-vehicle communication equipment 23 of the monitoring station 20 (the reception section 2 of the monitoring station-vehicle communication equipment 5 of the vehicle 10 is normal) (Step 105), and transmits the failure occurrence data indicating the 'failure of the transmission section of the monitoring station' to the monitoring station 20. This failure occurrence data or the normality confirmation data indicating the normality of the transmission section is periodically (e.g. along with the above mentioned position data) transmitted from the vehicles to the monitoring station 20 (Step 106).

If the vehicle 10 judges that the other vehicles received the above predetermined data, which was supposed to have been transmitted from the monitoring station 20 in Step 104, on the other hand, then the vehicle 10 judges that a failure occurred to the reception part 2 of the monitoring station-vehicle communication equipment 5 of own vehicle 10 (the transmission section 21 of the monitoring station-vehicle communication equipment 23 of the monitoring station 20 is normal) (Step 110), and transmits failure occurrence data indicating the 'failure of the reception section of the vehicle 10' to the monitoring station 20 (Step 111).

Figure 5:
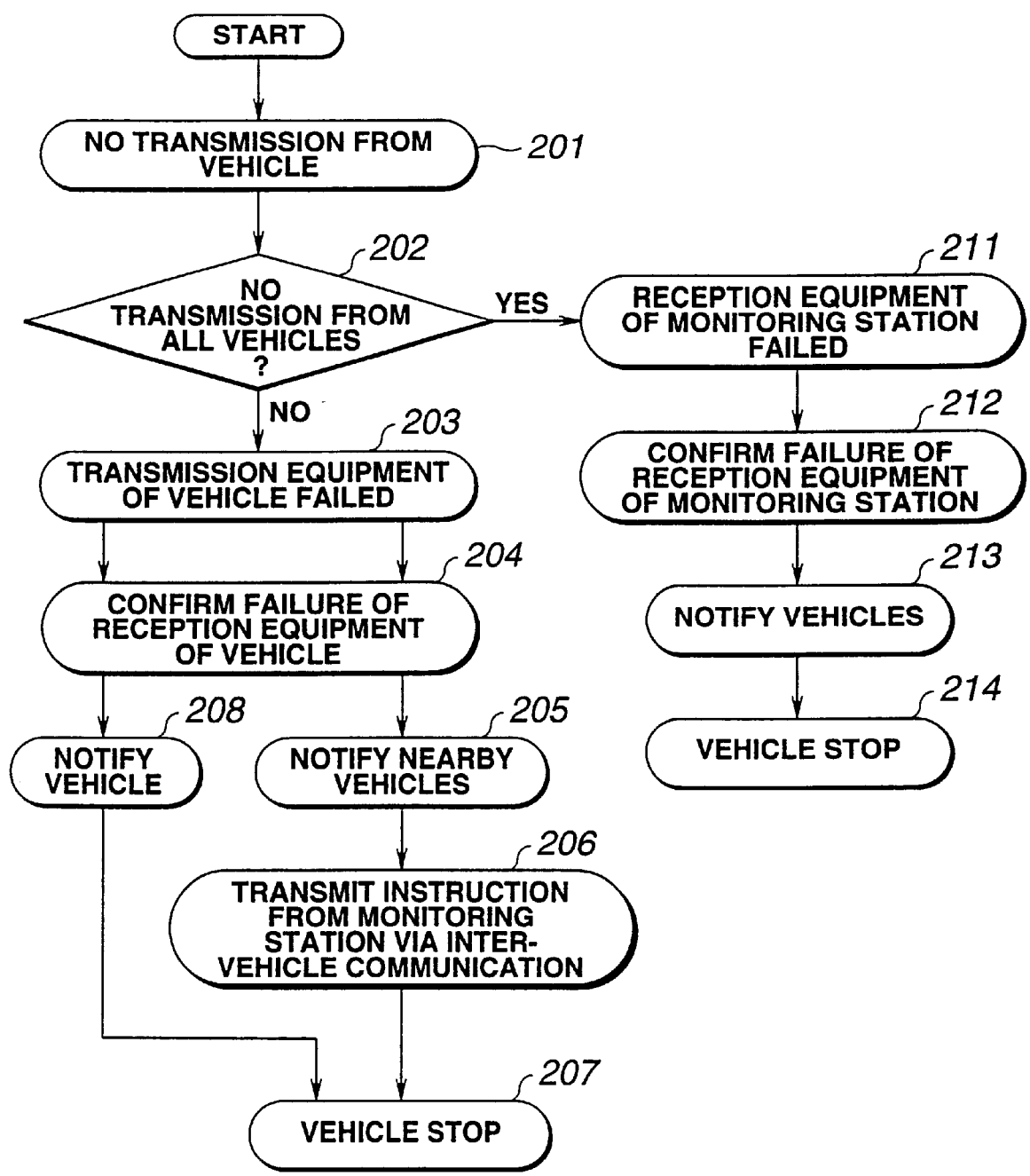
FIG. 5 is a flow chart indicating failure judgment and abnormality processing procedures in accordance with the present embodiment.

FIG. 5 is a flow chart indicating the failure Judgment and abnormality processing procedures when data is not transmitted from a vehicle to the monitoring station 20.

The monitoring station 20 sequentially judges whether the position data P is received each time the above mentioned predetermined time, when each vehicles pass the dividing point Q elapses.

If the periodical transmission of the position data P from a vehicle stops as the result of the judgment (Step 201), then the monitoring station 20 judges whether transmission from all the vehicles 10 . . . stopped (Step 202).

If the monitoring station 20 judges that the position data which is supposed to have been transmitted from a specific vehicle, the vehicle 10 for example, has not been received and that the position data transmitted from the other vehicles 11, 12 . . . has been received, then the monitoring station 20 judges that a failure occurred to the transmission section 1 of the monitoring station-vehicle communication equipment 5 of the vehicle 10 and confirms this judgment (Steps 203, 204). Then the monitoring station 20 transmits the command data indicating that 'a failure occurred to the transmission section of the vehicle 10, the vehicle 10 must stop' to a vehicle near the vehicle 10, the vehicle 11 for example (Step 205). The vehicle 11 receives this command data, and transmits this command data to the vehicle 10 where a failure occurred via the inter-vehicle communication equipment 6 (Step 206). The vehicle 10 receives this command data by the reception section 4 of its inter-vehicle communication equipment 6 which is operating normally, judges that 'the monitoring station 20 cannot know the current position of the vehicle 10 in this state, and sufficient information to avoid a collision of vehicles cannot be obtained', and the vehicle 10 stops to insure safety (Step 207).

After the monitoring station 20 judges that a failure occurred to the transmission section 1 of the monitoring station-vehicle communication equipment 5 of the vehicle 10 and confirmed this information in Steps 203 and 204, the monitoring station 20 transmits the failure occurrence data indicating the 'failure of the transmission section of the vehicle 10' to the vehicle 10. This failure occurrence data or the normality confirmation data indicating the normality of the transmission section is periodically transmitted from the monitoring station 20 to the vehicles (Step 208). Then the vehicle 10 stops (Step 207).

If, on the other hand, the monitoring station 20 judges that the position data was not received from all the vehicles 10 . . . in Step 202, then the monitoring station 20 judges that a failure occurred to the reception section 22 of the monitoring station-vehicle communication equipment 23 of the monitoring station 20 (the transmission section 1 of the monitoring station-vehicle communication equipment 5 of the vehicle is normal) (Step 211), confirms this judgment (Step 212) then transmits the failure occurrence data indicating the 'failure of the reception section of the monitoring station 20' to all the vehicles (Step 213). The respective vehicles which received this failure occurrence data judge that the monitoring station 20 cannot know the current positions of all the vehicles in this state, and the vehicles stop to insure safety judging that sufficient information to avoid a collision of vehicles cannot be obtained (Step 214).

Figure 6:
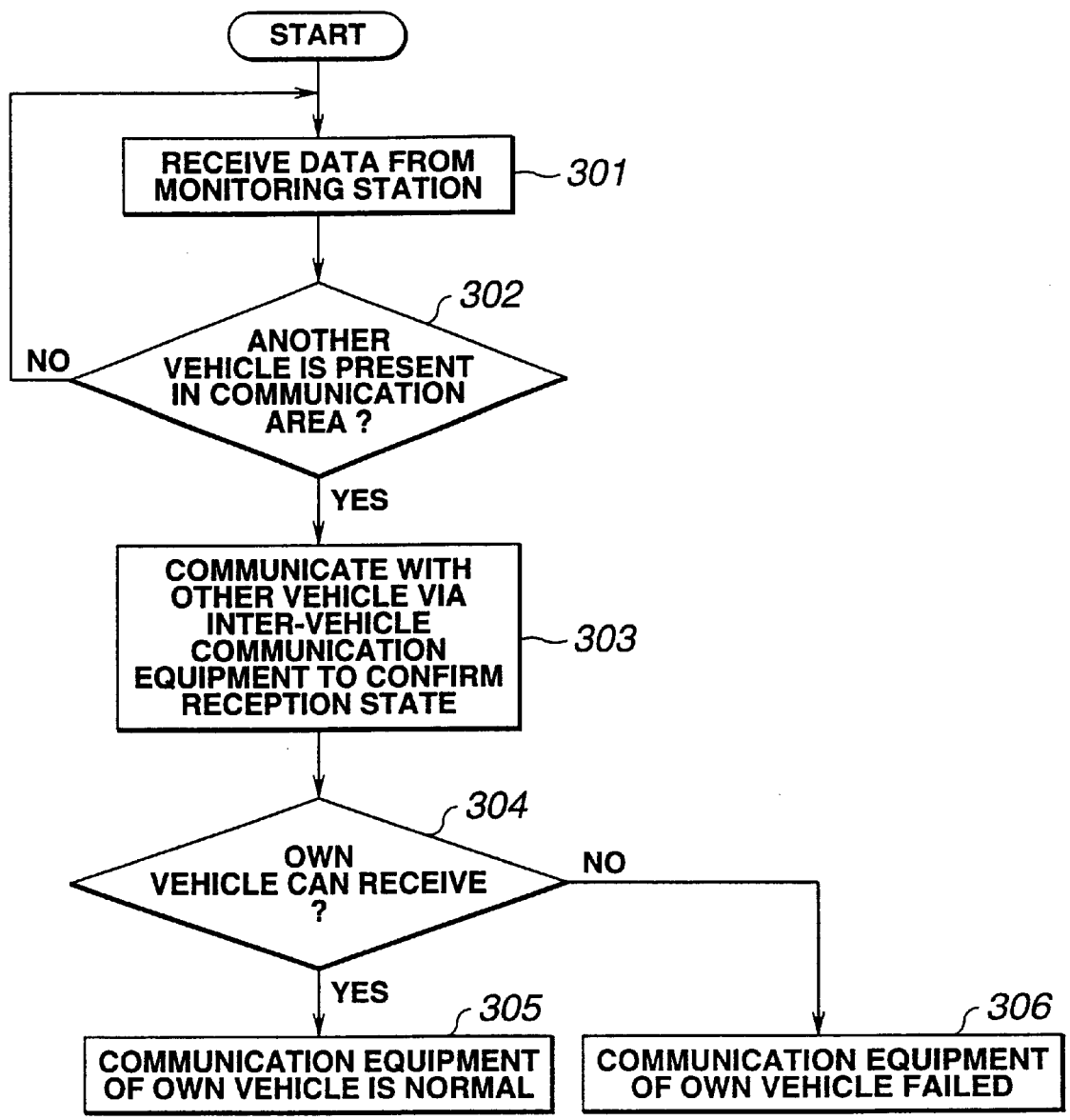
FIG. 6 is a flow chart indicating failure judgment and abnormality processing procedures in accordance with the present embodiment.

FIG. 6 is a flow chart indicating the failure judgment and abnormality processing procedures when the data cannot be transmitted between vehicles.

The monitoring station 20 transmits data indicating the mutual position relationships of all the vehicles via the transmission section 21 of the monitoring station-vehicle communication equipment 23 to the respective vehicles 10 . . . at a predetermined cycle. The respective vehicles 10 . . . , on the other hand, judge whether other vehicles are present within the communication distance of the inter-vehicle communication equipment 6 based on the above position relationship data (Steps 301 and 302).

If the vehicle 10, for example, judges that another vehicle, the vehicle 11, is present in the communication area, the vehicle 10 transmits/receives the position data to/from the vehicle 11 via the inter-vehicle communication equipment 6, and the vehicle 10 confirms the reception state (Steps 303 and 304). If the vehicle 10 cannot receive the position data from the vehicle 11 at this time (NO in Step 304), then the vehicle 10 judges that a failure occurred to at least the reception section 4 of the inter-vehicle communication equipment 6 of the vehicle 10, and executes abnormality processing, such as stopping the vehicle 10 (Step 306). If the vehicle 10 receives the position data from another vehicle, vehicle 11 (YES in Step 304), then the vehicle 10 confirms that the inter-vehicle communication equipment 6 of the vehicle 10 is normal (Step 305).

Figure 7:
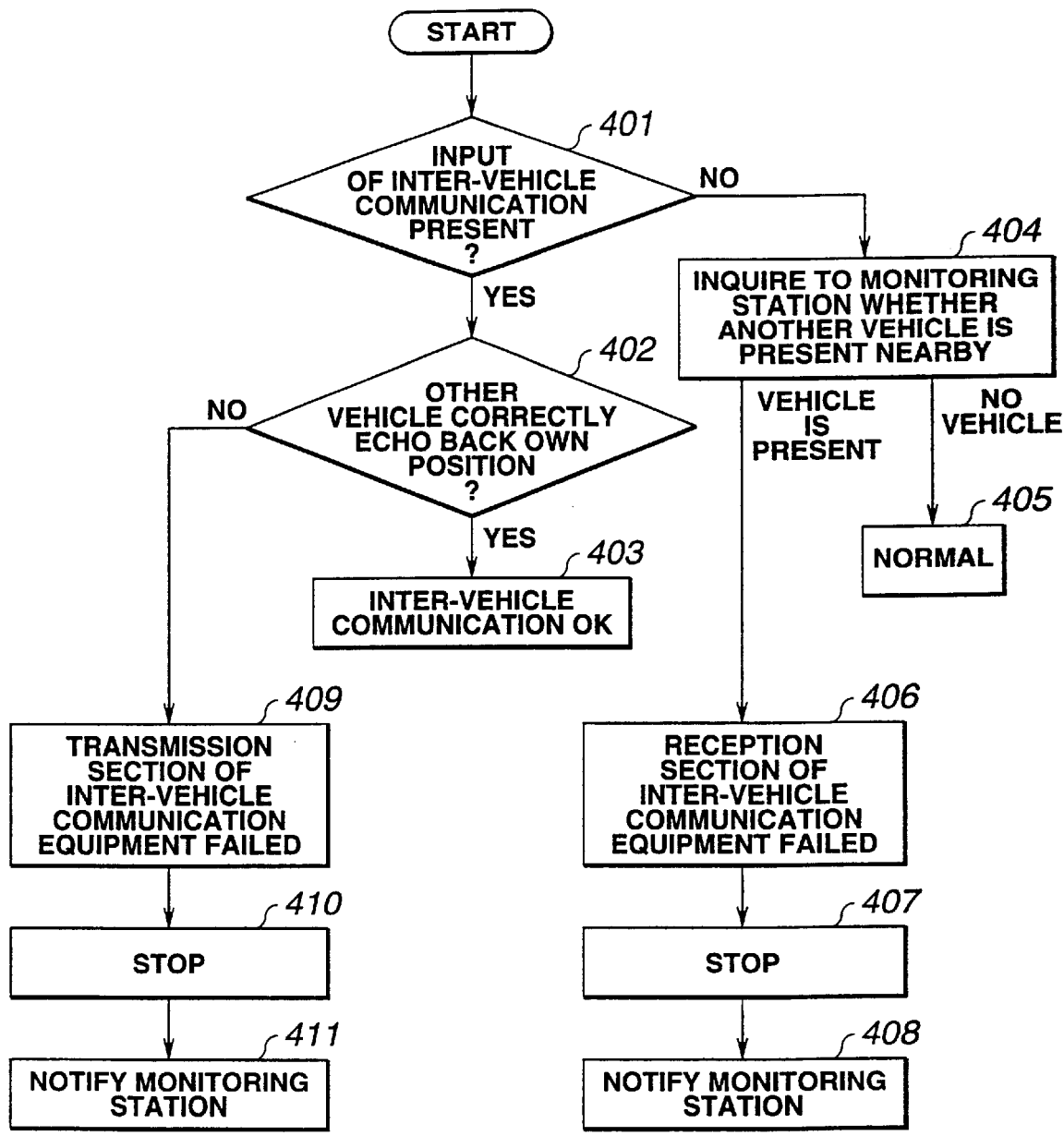
FIG. 7 is a flow chart indicating failure judgment and abnormality processing procedures in accordance with the present embodiment.

FIG. 7 is a flow chart indicating the failure judgment and abnormality processing procedures when data cannot be transmitted between vehicles.

A respective vehicle, the vehicle 10 for example, judges whether the position data has been transmitted from other vehicles 11, 12 . . . via the inter-vehicle communication equipment 6 each time a predetermined time elapses. This predetermined time has been set to a maximum time in which other vehicles can transmit the position data (Step 401) if the other vehicles are present within a communication distance of the inter-vehicle communication equipment 6.

If the vehicle 10 has not received the position data from other vehicles 11, 12 . . . after the above predetermined time elapses, then the vehicle 10 transmits information that the position data has not been received, and information to inquire 'whether another vehicle which can communicate via the inter-vehicle communication equipment 6 is present near the vehicle 10' is transmitted to the monitoring station 20 via the monitoring station-vehicle communication equipment 5 (Step 404).

The monitoring station 20 judges whether another vehicle is present within the communication distance of the inter-vehicle communication equipment 6 for the vehicle 10 which transmitted the above information, and if it is judged that another vehicle is present, then the monitoring station 20 judges that a failure occurred to the reception part 4 of the inter-vehicle communication equipment 6 of the vehicle 10 which sent the above information (Step 406).

Then the monitoring station 20 transmits the command data to stop the vehicle 10 to which a failure occurred to insure safety (Step 407), and the vehicle 10 which received this data stops and notifies the stopping to the monitoring station 20 (Step 408).

As a result of the inquiry in Step 404, it is judged that no vehicles are present within communication distance of the inter-vehicle communication equipment 6 for the vehicle 10, then the monitoring station 20 judges that the inter-vehicle communication equipment 6 of the vehicle 10 which transmitted the above information is normal (Step 405).

If the vehicle 10 received the position data from other vehicles 11, 12 . . . before the above predetermined time elapses in the above Step 401, then the vehicle 10 requests the other vehicle which transmitted this position data, the vehicle 11 for example, to transmit the position data of the vehicle 10 via the inter-vehicle communication equipment 6 (Step 402).

If the other vehicle 11 transmits the position of the vehicle 10 to the vehicle 10 via the inter-vehicle communication equipment 6 in response to the request, the vehicle 10 judges and confirms that the functions of the inter-vehicle communication equipment 6 are normal (Step 403).

If the other vehicle 11 does not transmit the position data of the vehicle 10 to the vehicle 10 via the inter-vehicle communication equipment 6 in response to the request in the above step 402, then the vehicle 10 judges that a failure occurred to the transmission section 3 of the inter-vehicle communication equipment 6 (Step 409), the vehicle 10 stops to insure safety (Step 410), and notifies the stopping to the monitoring station 20 (Step 411).

In the present embodiment, the respective vehicles transmit the position data to the monitoring station 20 at a predetermined interval, so that the monitoring station knows the general position relationships of the plurality of vehicles, but this process may be omitted and the functions of the monitoring station 20 may be limited only to instructing a destination to each vehicle (traveling instruction) where grasp of the mutual position relationships of the vehicles is left to the inter-vehicle communication.

The abnormality of at least the transmission section 21 of the monitoring station-vehicle communication equipment 23 of the vehicle 10 may be judged as follows.

1) Each one of the vehicle 10, 11, 12 . . . transmits the speed data of the vehicle each time the vehicle reaches the traveling points Q1, Q2 . . . of the traveling path 40.

2) Based on the transmitted speed data, the monitoring station 20 estimates the time required to allow for the vehicles 10, 11, 12 . . . to pass the next dividing point. If the position data which the vehicle 10 is supposed to have transmitted has not been received when this estimate time occurs, the monitoring station 20 judges that at least the transmission section 21 of the monitoring station-vehicle communication equipment 23 of the vehicle 10 has an abnormality.

Industrial Applicability

The present invention can be applied not only to vehicles traveling outdoors but to vehicles traveling indoors as well. For example, the present invention can be applied to the automatic carrier system in a factory.

What is claimed is:

1. A vehicle monitor comprising a plurality of vehicles each having vehicle position measurement means for measuring an own vehicle position and a monitoring station which transmits command data to instruct traveling to the plurality of vehicles, characterized in that:

first transmission/reception means for transmitting/receiving at least the command data between the monitoring station and the plurality of vehicles via a first communication system which enables wireless communication over distances between the monitoring station and the plurality of vehicles is provided in the monitoring station and the plurality of vehicles respectively, second transmission/reception means for transmitting/receiving position data measured by the vehicle position measurement means between the plurality of vehicles via a second communication system which enables wireless communication over distances between the plurality of vehicles and enables faster data transmission/reception than the first communication system is provided in the plurality of vehicles respectively, and the respective vehicles judge the approach of other vehicles by transmitting the position data between the plurality of vehicles via the second transmission/reception means provided in the plurality of vehicles respectively, so that mutual position relationships between the plurality of vehicles are monitored.

2. The vehicle monitor according to claim 1, characterized in that when data has not been input from other vehicles via the second transmission/reception means after the predetermined time elapses, the plurality of vehicles respectively transmit this information to the monitoring station via the first transmission/reception means, the monitoring station judges that another vehicle is present within a communication distance of the second transmission/reception means for the vehicle which transmitted the information, and in the case when this judgment is made, the respective vehicles judge that at least reception means of the second transmission/reception means of the vehicle which transmitted the information has an abnormality.

3. The vehicle monitor according to claim 1, characterized in that the monitoring station transmits predetermined data to the plurality of vehicles each time a predetermined time elapses, the plurality of vehicles judge whether the predetermined data has been received each time the predetermined time elapses, and in the case when it is judged that the predetermined data which is supposed to have been transmitted from the monitoring station has not been received, the respective vehicles judge that the first transmission/reception means has an abnormality and executes predetermined abnormality processing.

4. The vehicle monitor according to claim 1, characterized in that the plurality of vehicles respectively transmit own position data constantly to other vehicles via the second transmission/reception means, by which respective vehicles confirm the presence of a vehicle closest to own vehicle, and the position data is transmitted/received between the vehicles closest to each other via the second transmission/reception means, so as to perform control to prevent mutual interference of the vehicles closest to each other.

5. A vehicle monitor comprising a plurality of vehicles each having vehicle position measurement means for measuring an own vehicle position and a monitoring station which receives position data transmitted from the respective vehicles and transmits command data to instruct traveling to the plurality of vehicles while monitoring mutual position relationships of the plurality of vehicles based on the received position data, characterized in that:

first transmission/reception means for transmitting/receiving the position data and the command data between the monitoring station and the plurality of vehicles via a first communication system which enables wireless communication over distances between the monitoring station and the plurality of vehicles is provided in the monitoring station and the plurality of vehicles respectively, second transmission/reception means for transmitting/receiving the position data between the plurality of vehicles via a second communication system which enables wireless communication over distances between the plurality of vehicles and enables faster data transmission/reception than the first communication system, is provided in the plurality of vehicles respectively, the position data is transmitted to the monitoring station each time predetermined time elapses via the first transmission/reception means provided in the plurality of vehicles respectively, so that the monitoring station monitors the positions of the plurality of vehicles, and the respective vehicles Judge the approach of other vehicles by transmitting the position data between the plurality of vehicles via the second transmission/reception means provided in the plurality of vehicles respectively, so that the mutual position relationships between the plurality of vehicles are monitored.

6. The vehicle monitor according to claim 5, characterized in that a predetermined traveling path where the vehicles travel is divided, and the vehicles transmit the position data to the monitoring station each time the vehicles reach each dividing point.

7. The monitoring station according to claim 6, characterized in that the plurality of vehicles respectively transmit speed data of the vehicle to the monitoring station each time the vehicles reach the dividing point, and the monitoring station estimates a time required for the vehicle to pass a next dividing point based on the speed data, and in the case when the position data which is supposed to have been transmitted from the vehicle has not been received when the estimated time elapsed, the monitoring station judges that at least the transmission means of the first transmission/reception means of the vehicle has an abnormality.

8. The vehicle monitor according to claim 5, characterized in that the monitoring station judges whether the position data has been received each time the predetermined time elapses, and in the case when the position data which is supposed to have been transmitted from a specific vehicle has not been received and position data transmitted from other vehicles has been received as a result of the judgment, the monitoring station judges that at least the first transmission/reception means of the specific vehicle has an abnormality and transmits this information to the other vehicles via the first transmission/reception means, the other vehicles transmit this information to the specific vehicle via the second transmission/reception means, and the specific vehicle which received this information on the abnormality executes predetermined abnormality processing.

9. The vehicle monitor according to claim 5, characterized in that the plurality of vehicles respectively judge that another vehicle is present within a communication distance of the second transmission/reception means based on the position information of each vehicle transmitted from the monitoring station via the first transmission/reception means, and in the case when this judgment is made and the position data has not been received from the other vehicle via the second transmission/reception means, the respective vehicles judge that at least reception means of the second transmission/reception means of own vehicle has an abnormality and executes predetermined abnormality processing.

10. The vehicle monitor according to claim 5, characterized in that the monitoring station confirms the presence of vehicles closest to each other based on the position data transmitted from the plurality of vehicles via the first transmission/reception means and transmits this information to the vehicles closest to each other via the first transmission/reception means, and the vehicles closest to each other to which this information is transmitted transmit/receive the position data between the vehicles closest to each other via the second transmission/reception means, so as to perform control to prevent mutual interference of the vehicles closest to each other.

11. The vehicle monitor according to claim 5, characterized in that when data has not been input from other vehicles via the second transmission/reception means after the predetermined time elapses, the plurality of vehicles respectively transmit this information to the monitoring station via the first transmission/reception means, the monitoring station judges that another vehicle is present within a communication distance of the second transmission/reception means for the vehicle which transmitted the information, and in the case when this judgement is made, the respective vehicles judge that at least reception means of the second transmission/reception means of the vehicle which transmitted the information has an abnormality.

12. The vehicle monitor according to claim 5, characterized in that the monitoring station transmits predetermined data to the plurality of vehicles each time a predetermined time elapses, the plurality of vehicles judge whether the predetermined data has been received each time the predetermined time elapses, and in the case when it is judged that the predetermined data which is supposed to have been transmitted from the monitoring station has not been received, the respective vehicles judge that the first transmission/reception means has an abnormality and executes predetermined abnormality processing.

13. The vehicle monitor according to claim 5, characterized in that the plurality of vehicles respectively transmit own position data constantly to other vehicles via the second transmission/reception means, by which respective vehicles confirm the presence of a vehicle closest to own vehicle, and the position data is transmitted/received between the vehicles closest to each other via the second transmission/reception means, so as to perform control to prevent mutual interference of the vehicles closest to each other.

* * * * *